Figures 1, 2:
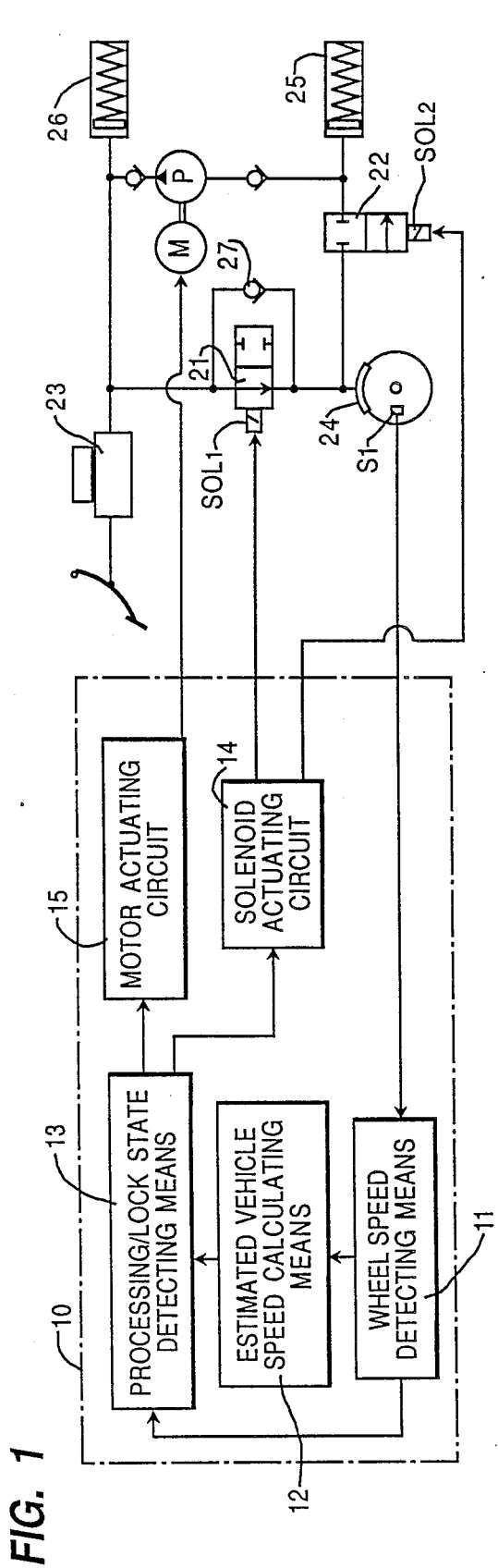

United States Patent [19]

Katayama et al.

[11] Patent Number: 4,980,831

[45] Date of Patent: Dec. 25, 1990

[54] ANTILOCK CONTROL DEVICE

[75] Inventors: Yoshio Katayama; Hirohisa Tanaka, both of Itami, Japan

[73] Assignee: Sumitomo Electric Industries, Ltd., Osaka, Japan

[21] Appl. No.: 437,845

[22] Filed: Nov. 17, 1989

[30] Foreign Application Priority Data

Nov. 22, 1988 [JP] Japan .................................. 63-295265

[51] Int. Cl.$^5$ .......................... G06F 7/70; G06F 15/48; G06F 15/50; B06T 8/70
[52] U.S. Cl. ........................... 364/426.02; 364/426.01; 303/94; 303/98; 303/106
[58] Field of Search ...................... 364/426.02, 426.01, 364/426.03, 426.04; 303/106–109, 93–100; 180/197

[56] References Cited

U.S. PATENT DOCUMENTS

| 3,964,796 | 6/1976 | Bremer | 303/107 |
| 4,802,711 | 2/1989 | Muto et al. | 364/426.02 X |
| 4,818,037 | 4/1989 | McEnnan | 364/426.02 X |
| 4,836,619 | 6/1989 | Muto | 364/426.02 X |

Primary Examiner—Parshotam S. Lall
Assistant Examiner—Ed Pipala
Attorney, Agent, or Firm—Wenderoth, Lind & Ponack

[57] ABSTRACT

An antilock control device has a calculating unit for calculating the vehicle speed from the wheel speed signals from wheel speed sensors, a processing/lock state detecting unit adapted to judge whether the wheels are showing a locking tendency or recovering from locked state on the basis of the signals from the wheel speed sensors and the calculating unit and produce a command to reduce or increase the braking pressure on the basis of the result of judgement, and a brake fluid pressure circuit operable in response to the pressure control command from the lock state detecting unit. The calculating unit is adapted to select the highest wheel speed and the lowest wheel speed from among the wheel speeds of all the wheels, judge whether or not the difference therebetween is smaller than a predetermined value, select the highest wheel speed as a reference wheel speed if the difference is smaller than the predetermined value and select the lowest wheel speed as the reference wheel speed if the difference is larger than the predetermined value, and calculate the vehicle speed from the reference wheel speed.

2 Claims, 2 Drawing Sheets

ANTILOCK CONTROL DEVICE

The present invention relates to an antilock control device having means for estimating the vehicle speed of a four-wheel drive motor vehicle.

An antilock control device is used to maintain the slip rates of the wheels { (vehicle speed−wheel speed) / vehicle speed×100 per cent } within a range such that the coefficient of friction between the wheel tires and the road surface will be maximized. Thus, it is important for an antilock control device to be capable of measuring the vehicle speed. In spite of this fact, most of the antilock control devices currently in practical use do not directly measure the vehicle speed. Instead, the vehicle speed is usually estimated or calculated from the wheel speeds, more specifically from the wheel speed of one of the non-driven wheels which is rotating at a higher speed than the other, because this wheel is less susceptible to spin.

With a four-wheel drive vehicle, however, since the abovesaid method is useless, the estimated vehicle speed is usually calculated from the wheel speed of the wheel rotating at the highest speed among all of the wheels.

The problem with this method is that the driven wheels are susceptible to spin against the frictional resistance between the tires and the road surface. If the wheel speed of a spinning wheel is used in estimating the vehicle speed, the estimated vehicle speed will be considerably larger than the actual vehicle speed. In order to prevent this, one method entails using the wheel speed of the wheel rotating at the lowest speed of all the wheels to estimate the vehicle speed. However, if this selected wheel is falling into a locked state due to braking, the estimated vehicle speed will be considerably lower than the actual vehicle speed.

Unless all the wheels are directly coupled together and adapted to always rotate in perfect synchronization with one another, the wheels tend to rotate at different speeds from one another if one or more of them is showing a tendency to spin or lock. In order to estimate the vehicle speed with high accuracy, it is desirable to take into account the difference among the wheel speeds in estimating the vehicle speed.

It is an object of the present invention to provide an antilock control device which can detect the spinning wheel and the locking wheel from the difference among the wheel speeds and prevent the estimated vehicle speed from excessively deviating from the actual vehicle speed.

In accordance with the present invention, in the antilock control device having means for calculating the estimated vehicle speed from wheel speed signals, the calculating means is adapted to select the highest wheel speed and the lowest wheel speed from among the wheel speeds of all the wheels, to judge whether or not the difference therebetween is smaller than a predetermined value, to select the highest wheel speed as a reference wheel speed if the difference is smaller than the predetermined value and to select the lowest wheel speed as the reference wheel speed if the difference is larger than the predetermined value, and to calculate the estimated vehicle speed from the thus selected reference wheel speeds.

If the difference between the highest wheel speed and the lowest wheel speed is small, it is judged that all the wheels are rotating at substantially the same speed and that none of the wheels is locking or spinning, and the vehicle speed is estimated from the highest wheel speed.

If there is a considerable difference between the highest wheel speed and the lowest wheel speed, there is a strong possibility that the wheel judged to be rotating at the highest speed is actually spinning. In such a case, the vehicle speed is estimated from the lowest wheel speed. Therefore, the vehicle speed can be estimated with a high accuracy.

Figure 3:
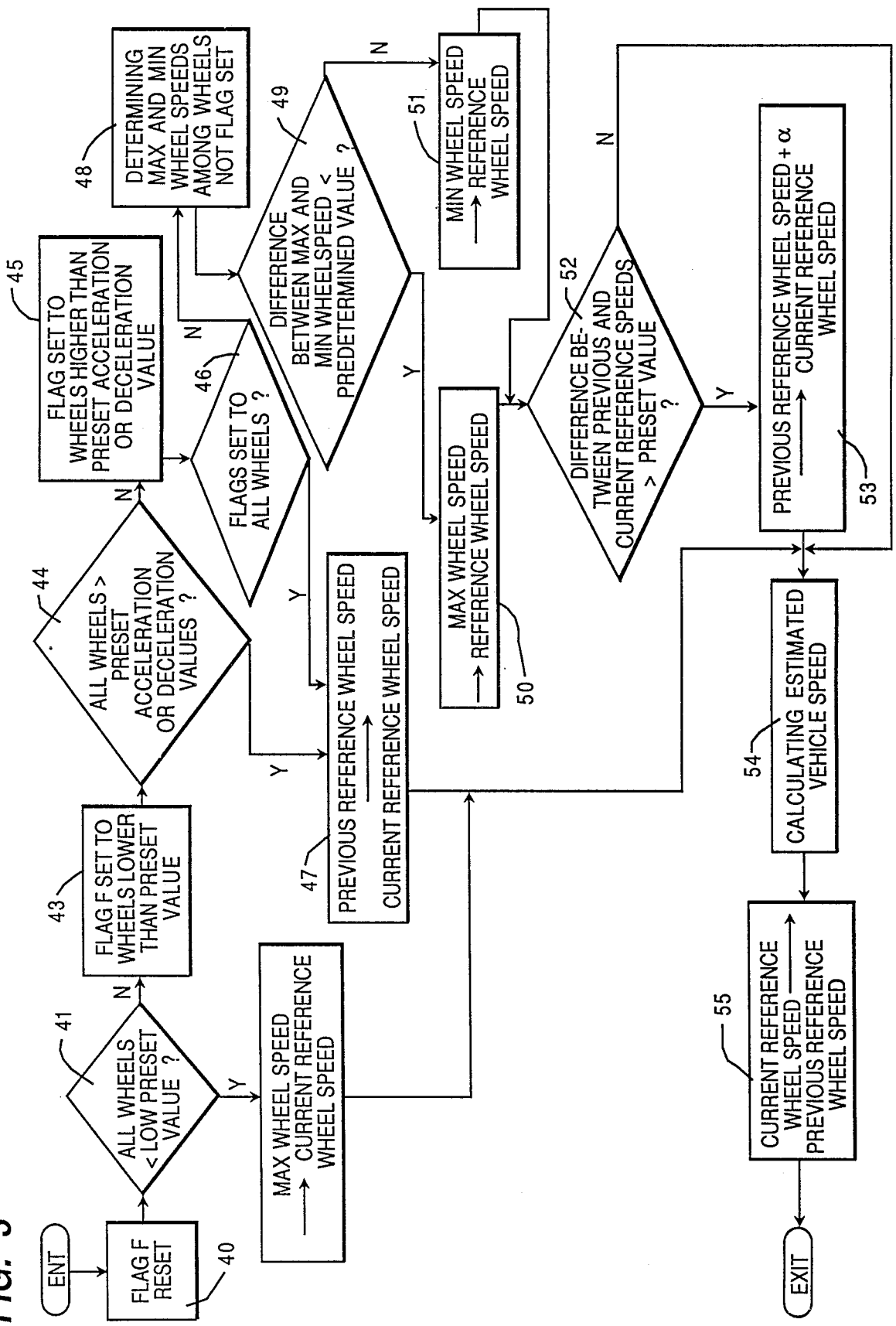

Other features and objects of the present invention will become apparent from the following description taken with reference to the accompanying drawings, in which:

FIG. 1 is a diagram of the antilock control device embodying the present invention; and FIGS. 2 and 3 are flow charts showing how the estimated vehicle speed is calculated.

As shown in FIG. 1, the antilock control device according to the present invention includes an electronic control unit 10 which performs various calculations and judgements on the basis of the input signals supplied from wheel speed sensors S1 to S4 (only S1 is shown) to produce signals for controlling a braking fluid pressure circuit.

The signals from the wheel speed sensor S1, which are AC voltage signals, are converted into pulses and fed into a wheel speed detecting unit 11 for counting and calculating the pulses to convert them into wheel speed signals, which are fed to a calculating unit 12 for calculating the estimated vehicle speed and to a processing/lock state detecting unit 13. If the processing/lock state detecting deceleration calculated in the unit 13 decreases below a predetermined value or if the slip rate (the difference between the estimated vehicle speed calculated in the unit 12 and the wheel speed) increases above a predetermined value, it is judged that the wheel is showing a tendency to lock and a pressure reduction command is given to a solenoid actuating circuit 14, which energizes solenoids SOL1 and SOL2 to move a pressure control valve 21 leftwardly and a pressure control valve 22 upwards as shown in FIG. 1, thereby closing a hydraulic circuit connecting a master cylinder 23 to a wheel cylinder 24 and opening a circuit connecting the wheel cylinder 24 to a reservoir 25. The pressure reduction command is also given to a motor actuating circuit 15 to actuate a motor M and direct the brake fluid from the reservoir 25 to an accumulator 26 and the master cylinder 23 by means of a pump P. Thus the brake pressure will decrease.

When the deceleration or the slip rate exceeds a predetermined value as a result of an increase of the wheel speed, it is judged that the locking tendency has disappeared. Now the lock state detecting unit 4 will give a pressure increase command to the solenoid actuating circuit 14, which will deenergize both solenoids SOL1 and SOL2. The pressure control valve 21 and 22 will return to the position shown in FIG. 1, thus opening the hydraulic circuit connecting the pressure source and the wheel cylinder 24. The brake pressure will thus increase.

If the pressure increase or pressure reduction command is interrupted by a pressure hold command, the solenoids SOL1 and SOL2 are adapted to be energized and deenergized, respectively, to move the pressure control valve 21 leftwardly, while keeping the pressure control valve 22 in the position shown in FIG. 1. Since the brake fluid in the wheel cylinder 24 is sealed up in this state, the braking pressure is kept constant. Numeral 27 in FIG. 1 designates a bypass valve.

There are various conceivable conditions and timings to interrupt the pressure reduction command with the pressure hold command, e.g. to give the pressure hold command when the pressure reduction command is maintained for a predetermined time, or when the deceleration of the wheel has exceeded a threshold value.

Similarly, there are various conceivable conditions and timings to alternately give the pressure increase command and the pressure hold command. Ordinarily the pressure hold command is given at predetermined time intervals determined by a pulse generator or the like.

Indices other than the deceleration and slip rate may be used in judging whether or not the wheel is showing a tendency to lock or whether or not the tendency has disappeared.

In the example shown in FIG. 2, the estimated vehicle speed calculating unit 12 is in the form of a computer program. It operates as follows.

In Step 30, the highest wheel speed and the lowest wheel speed are selected from among the wheel speeds of all the wheels. In Step 31, it is determined whether or not the difference between the highest wheel speed and the lowest one is below a predetermined value, which may be a difference between the wheel speed of a spinning wheel and that of the other wheels, estimated through experience.

If judged YES in Step 31, which means that the wheel speed difference among wheels is sufficiently small and thus the wheels are rotating at substantially the same speed, the highest wheel speed is selected as a reference wheel speed in Step 32. If judged NO in Step 31, which means that the wheel speed difference among the wheels is considerably large, the lowest wheel speed is selected as the reference wheel speed in Step 33.

In Step 34, the vehicle speed is estimated e.g. by subjecting the reference wheel speed to filtering.

If the difference between the highest wheel speed and the lowest one is larger than a predetermined value, it is highly probable that one of the wheels is spinning. However, one of the wheels may be rotating at an abnormally lower speed than the other wheels.

Further, even if the difference between the highest wheel speed and the lowest one is smaller than the predetermined value, there is a possibility that some of the wheels are just about to fall into spinning or locking state.

If the selection of the reference speed is made as described above in such a situation, the vehicle speed estimated from the reference wheel speed might widely differ from the actual vehicle speed. In order to prevent this, if the behavior of a given wheel is abnormal, its wheel speed should not be selected as the reference wheel speed.

FIG. 3 shows an example of a routine for calculating the estimated vehicle speed, the routine incorporating the abovesaid selection process.

In Step 40, flags F are reset which are allotted to the respective wheels to indicate the wheel or wheels to be selected. In Step 41, it is determined whether or not all the wheels are rotating at speeds lower than a comparatively low predetermined speed. If judged YES, the highest wheel speed of all the wheel speeds is selected as the current reference wheel speed in Step 42. Then in Step 54, the vehicle speed is calculated based on the current reference wheel speed. After storing the current reference wheel speed as the previous reference wheel speed in Step 55, the program proceeds to the processing/lock state detecting unit 13 (FIG. 1) through exit EXT. On the other hand, if even one of the wheels is rotating at a speed higher than the abovementioned comparatively low predetermined speed, the flag F is set to the other wheels in Step 43.

In Step 44, it is determined whether or not the accelerations or decelerations of all the wheels are larger than a predetermined value in order to check if the wheels are rapidly falling into a spinning or locking state. If all the wheels are showing such a tendency, it is dangerous to estimate the vehicle speed based on the wheel speeds then. In such a case, the previous reference wheel speed is used as the current reference wheel speed. The program then proceeds to Steps 54 and 55.

If judged NO in Step 44, flags F are set for the wheels of which the decelerations or accelerations are larger than the predetermined values in Step 45. The flags F used in Step 45 may be of the same type as used in Step 43. They can be set again even if flags have already been set in Step 43.

In Step 46, it is determined whether or not the flags F are set for all the wheels, in other word, whether or not the wheels are rotating at speeds lower than the predetermined speed, or whether or not their accelerations or decelerations are higher than the predetermined value. If judged YES, the previous reference wheel speed is selected as the current reference wheel speed in Step 47. If not, the program proceeds to Step 48.

In Step 48, the highest wheel speed and the lowest wheel speed are selected from among the wheel speeds of the wheels for which the flags are not set, i.e. the wheels which are showing no abnormal behavior. The processes in Steps 49, 50 and 51 are the same as those in Steps 31, 32 and 33 in FIG. 2.

In Step 52, it is determined whether or not the difference between the current reference wheel speed and the previous one is lower than a predetermined value, in other words, whether or not the acceleration of the vehicle is lower than a predetermined value, in order to check if the vehicle is accelerated too sharply. If the acceleration is larger than the predetermined value, a value calculated by adding a rather small value $\alpha$ to the previous reference wheel speed is used as the current reference wheel speed in Step 53. The program then proceeds to Steps 54 and 55.

In Step 54, the estimated vehicle speed is calculated. In Step 55, the current reference wheel speed is stored as the previous reference wheel speed.

What is claimed is:
1. An antilock control device comprising:
wheel speed detecting means for detecting wheel speeds of each wheel of a motor vehicle to produce wheel speed signals;
a calculating means for calculating an estimated vehicle speed in accordance with said wheel speed signals;
a processing/lock state detecting means for executing predetermined operations on the basis said wheel speed signals and said estimated vehicle speed, for determining a locking state of the wheels, and for producing a brake pressure control command in accordance with the thus determined locking state; and
a brake fluid pressure circuit operable in response to said pressure control command, said calculating means including means for selecting a highest wheel speed and a lowest wheel speed from among the wheel speeds of all the wheels, and for determining whether the difference therebetween is smaller than a predetermined value, and for selecting said highest wheel speed as a reference wheel speed if said difference is smaller than said predetermined value, and for selecting said lowest wheel speed as the reference wheel speed if said difference is larger than said predetermined value, and for calculating the estimated vehicle speed based on the thus selected reference wheel speed.

2. An antilock control device comprising:
wheel speed detecting means for detecting wheel speeds of each wheel of a motor vehicle to produce wheel speed signals;
a calculating means for calculating an estimated vehicle speed in accordance with said wheel speed signals;
a processing/lock state detecting means for executing predetermined operations on the basis said wheel speed signals and said estimated vehicle speed, for determining a locking state of the wheels, and for producing a brake pressure control command in accordance with the thus determined locking state; and
a brake fluid pressure circuit operable in response to said pressure control command,
said calculating means including means for identifying non-abnormal wheels from among the wheels, each of said non-abnormal wheels having a wheel speed exceeding a first preset value and an acceleration which is less than a second preset value and a deceleration which is less than a third preset value, and for selecting a highest wheel speed and a lowest wheel speed from among said non-abnormal wheels, and for determining whether the difference therebetween is smaller than a predetermined value, and for selecting said highest wheel speed as a reference wheel speed if said difference is smaller than said predetermined value, and for selecting said lowest wheel speed as the reference wheel speed if said difference is larger than said predetermined value, and for calculating the estimated vehicle speed based on the thus selected reference wheel speed.

* * * * *